(12) United States Patent
Princivalle et al.

(10) Patent No.: US 9,101,916 B2
(45) Date of Patent: Aug. 11, 2015

(54) EXHAUST GAS TREATMENT CATALYST

(71) Applicants: SAINT-GOBAIN CENTRE DE RECHERCHES ET D'ETUDES EUROPEEN, Courbevoie (FR); CENTRE NATIONAL DE LA RECHERCHE SCIENTIFIQUE, Paris Cedex (FR)

(72) Inventors: Agnes Princivalle, Lagnes (FR); Daniel Aubert, Carpentras (FR); Christian Guizard, Cournonterral (FR); Helena Kaper, Les Angles (FR); Michaela Klotz, Le Thor (FR)

(73) Assignees: SAINT-GOBAIN CENTRE DE RECHERCHES ET D'ETUDES EUROPEEN, Courbevoie (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 14/365,738

(22) PCT Filed: Dec. 14, 2012

(86) PCT No.: PCT/FR2012/052942
§ 371 (c)(1),
(2) Date: Jun. 16, 2014

(87) PCT Pub. No.: WO2013/088091
PCT Pub. Date: Jun. 20, 2013

(65) Prior Publication Data
US 2015/0111729 A1 Apr. 23, 2015

(30) Foreign Application Priority Data

Dec. 16, 2011 (FR) ...................... 11 61800

(51) Int. Cl.
| | |
|---|---|
| *B01J 23/10* | (2006.01) |
| *B01J 23/89* | (2006.01) |
| *B01J 23/00* | (2006.01) |
| *B01D 53/86* | (2006.01) |
| *B01D 53/94* | (2006.01) |
| *B01J 23/63* | (2006.01) |
| *B01J 23/83* | (2006.01) |
| *C01G 49/00* | (2006.01) |
| *C01G 55/00* | (2006.01) |
| *F01N 3/10* | (2006.01) |

(52) U.S. Cl.
CPC ............ *B01J 23/894* (2013.01); *B01D 53/864* (2013.01); *B01D 53/945* (2013.01); *B01J 23/002* (2013.01); *B01J 23/63* (2013.01); *B01J 23/83* (2013.01); *C01G 49/0054* (2013.01); *C01G 55/002* (2013.01); *B01D 2255/1021* (2013.01); *B01D 2255/2061* (2013.01); *B01D 2255/2065* (2013.01); *B01D 2255/20707* (2013.01); *B01D 2255/20738* (2013.01); *B01D 2255/40* (2013.01); *B01D 2258/012* (2013.01); *B01D 2258/014* (2013.01); *B01J 2523/00* (2013.01); *F01N 3/103* (2013.01); *F01N 2570/10* (2013.01); *Y02T 10/22* (2013.01)

(58) Field of Classification Search
CPC ............ B01J 23/10; B01J 23/63; B01J 23/83; B01J 23/894
USPC .................................................. 502/302–304
See application file for complete search history.

(56) References Cited

U.S. PATENT DOCUMENTS

| | | | | |
|---|---|---|---|---|
| 3,929,670 A | * | 12/1975 | Kudo et al. .................... | 502/244 |
| 4,492,769 A | | 1/1985 | Blanchard et al. | |
| 4,581,343 A | | 4/1986 | Blanchard et al. | |
| 4,601,883 A | * | 7/1986 | Sekido et al. .................... | 422/94 |
| 5,447,705 A | * | 9/1995 | Petit et al. .................. | 423/418.2 |
| 5,837,642 A | * | 11/1998 | Tanaka et al. .................. | 502/304 |
| 5,939,354 A | * | 8/1999 | Golden .......................... | 502/400 |
| 5,976,476 A | | 11/1999 | Blanchard et al. | |
| 5,977,017 A | * | 11/1999 | Golden .......................... | 502/302 |
| 6,261,989 B1 | * | 7/2001 | Tanaka et al. .................. | 502/217 |
| 6,352,955 B1 | * | 3/2002 | Golden .......................... | 502/302 |
| 6,355,220 B1 | * | 3/2002 | Blanchard et al. ......... | 423/242.1 |
| 6,387,338 B1 | * | 5/2002 | Anatoly et al. ............. | 423/239.1 |

(Continued)

FOREIGN PATENT DOCUMENTS

| | | |
|---|---|---|
| EP | 0 100 267 | 2/1984 |
| EP | 0 126 676 | 11/1984 |

(Continued)

OTHER PUBLICATIONS

International Search Report Issued Mar. 21, 2013 in PCT/FR12/052942 filed Dec. 14, 2012.

*Primary Examiner* — Cam N. Nguyen
(74) *Attorney, Agent, or Firm* — Oblon, McClelland, Maier & Neustadt, L.L.P.

(57) ABSTRACT

Catalyst system suitable especially for the removal of CO compounds, comprising or consisting of an oxide, preferably of fluorite crystalline structure, conforming to the following molar formulation:

$$Ce_{1-u}M_yA_zD_vO_{2-x},$$

wherein Ce is cerium, A represents at least one element possessing a plurality of oxidation states and selected from Ti, Ga, In, V, Cr, Mn, Fe, Sn, Co, Ni, Cu, M represents at least one element selected from Gd, Y, Sc, Sm, Nd, Pr, Zn, D represents at least one element other than A and selected from Pt, Pd, Rh, Ru, Cu, Fe, Ag, and Au, u is between 0.05 and 0.45, y is between 0.01 and 0.4, Z is greater than 0 and less than 0.4, v is between 0.001 and 0.4, and x is greater than 0.

19 Claims, No Drawings

(56) References Cited

U.S. PATENT DOCUMENTS

| | | |
|---|---|---|
| 6,458,741 B1 | 10/2002 | Roark et al. |
| 6,531,425 B2 * | 3/2003 | Golden ......................... 502/302 |
| 6,881,384 B1 * | 4/2005 | Uenishi et al. ................. 422/177 |
| 7,081,430 B2 * | 7/2006 | Uenishi et al. ................. 502/327 |
| 7,166,267 B2 * | 1/2007 | Villa ........................ 423/594.12 |
| 7,641,875 B1 * | 1/2010 | Golden ...................... 423/213.5 |
| 7,875,250 B2 * | 1/2011 | Nunan .......................... 422/177 |
| 2004/0018939 A1 | 1/2004 | Chigapov et al. |
| 2006/0100097 A1 | 5/2006 | Chigapov et al. |

FOREIGN PATENT DOCUMENTS

| | | |
|---|---|---|
| EP | 1 378 289 | 1/2004 |
| FR | 2 729 309 | 7/1996 |
| WO | 2011/064655 | 6/2011 |
| WO | 2011/157963 | 12/2011 |
| WO | 2011/157964 | 12/2011 |

* cited by examiner

EXHAUST GAS TREATMENT CATALYST

The present invention relates to the field of the purification of a gas laden with gaseous pollutants essentially of the CO type but also VOCs (volatile organic compounds), "HCs" (unburned hydrocarbons) and even $SO_x$ or $NO_x$ compounds. The invention relates more particularly to catalyst systems for treatment of gases of very low temperature, typically between the ambient and less than 150° C. A system of this kind that is used may perform very highly for the treatment particularly at the exhaust outlet of a diesel or petrol engine, allowing the joint or non-joint removal of CO and of the unburned hydrocarbons and the $NO_x$ species.

The techniques and problems associated with the purification of polluted gases are well known in the art, whether in relation to the ambient air, especially in homes or in driver/passenger compartments, or else in relation to gases emitted by motor vehicles at the outlet of the exhaust lines of petrol or diesel automobiles, or to other gases, especially those produced by reactors or motors.

Various techniques for treating VOCs are thus presented in the techniques of the engineer Doc. J 3 928 in accordance more particularly with the concentration, the gas flow rate and the number of pollutants to be treated. One well-known technique consists in particular of an oxidation of the VOCs to $CO_2$ and $H_2O$, with the most exacting techniques integrating a thermal treatment.

Hence two publications are known in Applied catalysis B: environmental 65(2006) pages 37-43 or B: environmental 73(2007) pages 282-291, describing low-temperature catalyst systems comprising precious metals on a titanium oxide, silicon oxide or zirconium oxide support material. The treatments described are intended primarily for oxidizing formaldehydes. The mass loading of precious metals (particularly Pt, Rh or Au) is at least 0.6% of the mass of the support material.

Photocatalysis is another system, effective at low temperature, for oxidizing CO and volatile organic compounds (VOCs). This system, however, requires the input of UV radiation.

With regard to the application in decontamination of gases emitted by combustion engines, conventional three-way catalysts are known which allow the joint treatment of the $NO_x$, CO and HC pollutants and their conversion to neutral and chemically harmless gases such as $N_2$, $CO_2$ and $H_2O$. Excellent efficacy in this system, however, is attained only by continual regulation of the richness of the air/fuel mixture. It is known, accordingly, that the slightest deviation from the stoichiometry of the mixture gives rise to a sharp increase in the emissions of pollutants. Moreover, these systems operate poorly at low temperature, and remain amenable to improvement especially in the engine startup phase.

One of the aims of the present invention is to overcome such deficiencies, in particular by allowing the conversion of a substantial quantity of the pollutant species, especially of the carbon monoxide type—CO—irrespective of the chemical composition of the gas mixture to be purified, without input of energy or external radiation, and from very low temperatures, even the ambient temperature (25° C.)

Known from patent U.S. Pat. No. 5,939,354 A is a perovskite-type compound of formula $A_{a-x}B_xMO_b$ in which A symbolizes an assembly of elements from the group of the lanthanides, said compound being obtained from bastnaesite, B is a monovalent or divalent cation; and M may be a transition metal, especially a precious metal, more particularly selected from Pt, Pd, Rh, or Au. The experiments conducted by the applicant company have shown that these perovskite type structures are, however, thermodynamically unstable and sensitive to changes in atmosphere.

International application WO 2011/068509 describes a multiphase compound of typical general formula $Ce_yLn_{1-x}A_{x+s}MO_2$ in which A is an alkali metal or alkaline earth metal (selected from Mg, Ca, Sr, Ba, Li, Na, K, Cs and Rb) and M may be a transition metal. According to one particular embodiment, the system may comprise a layer of ceria partially substituted in particular by zirconium and yttrium. The preparation process involves mixing the precursors, drying the mixture, and then heating it at between 500 and 1000° C.

Also known, from application WO 2008/023223, is a catalyst system of formula $Ce_{1-x-y-z}M_zN_yK_2O_{2-d}$, where M, N and K are metals selected from Pd, Pt, Rh, Ru, Zr, Ni and Cu, allowing conversion of the gaseous pollutants CO, NO and "HC", at low temperature. This publication proposes in particular use of a ceria comprising in its crystal lattice one or more catalytically active metals, more particularly precious metals such as Pd, Pt or Rh. The experiments conducted by the applicant company have shown, however, here again, that such a realization is of low thermodynamic stability. More particularly, the resulting structure is significantly unstable to sharp changes in atmosphere (oxidizing to reducing) or else in temperature. This instability under the normal conditions of such a catalyst greatly limits its possible use as a catalyst system.

A need exists, therefore, for a simple autonomous catalyst system which is stable under the conditions of its use, allowing in particular the direct removal of pollutants at least of CO type, said system allowing the conversion without need for a supplementary material which adsorbs these pollutant materials, in a very selective way, in other words at more than 80 mol %, or even more than 90 mol %, said system being able to operate irrespective of the overall atmosphere of the gases to be treated, and being oxidizing, neutral or reducing, more particularly oxidizing, and under conditions of very low temperature, especially less than 150° C., or even at the ambient temperature. The system, moreover is to have a very high catalytic stability over time, in other words a very high resistance to aging at low temperature and irrespective of the aforementioned overall atmosphere.

According to a first aspect, the present invention relates to a catalyst system suitable especially for the removal of CO compounds, comprising or consisting of an oxide preferably of fluorite structure, conforming to the following molar formulation:

$$Ce_{1-u}M_yA_zD_vO_{2-x},$$

wherein:
Ce is cerium,
u is between 0.05 and 0.45,
M represents at least one element selected from the following: Gd, Y, Sc, Sm, Nd, Pr, Zn,
y is between 0.01 and 0.4,
A represents at least one element possessing a plurality of oxidation states and selected from the following: Ti, Ga, In, V, Cr, Mn, Fe, Sn, Co, Ni, Cu,
z is greater than 0 and less than 0.4,
D represents at least one element other than A and chosen from: Pt, Pd, Rh, Ru, Cu, Fe, Ag, and Au,
v is between 0.001 and 0.4,
x is greater than 0.

In the formulation above, preferably, 1−u is equal to 1−y−z−v.

This system advantageously has an activity in any type of atmosphere, whether oxidizing, neutral or reducing. According to another advantage, it also has a high activity at very low temperature, more particularly at a temperature of less than 70° C.

The electronic resistivity of the ion- and electron-conducting oxide is less than 1000 ohms·cm at 400° C. and its ionic conductivity is between $10^{-6}$ and 1 siemens/cm at 400° C. under atmospheric pressure.

The ionic and electronic conductivities may be measured by conventional impedance techniques, for example as described in the publication *Acta Materialia*, vol. 56, pages 4658-4672 (2008).

According to embodiments of the invention which are preferred but do not limit the invention, it being possible where appropriate for these embodiments to be combined with one another:

- x is greater than 0.05 and less than 0.5, and preferably is between 0.1 and 0.4, very preferably between 0.1 and 0.3.
- y is between 0.05 and 0.3, more preferably between 0.1 and 0.3.
- z is between 0.01 and 0.2, especially between 0.01 and 0.1.
- v is between 0.005 and 0.2, more preferably between 0.005 and 0.1, or even between 0.005 and 0.05.
- The ion- and electron-conducting oxide conforms to the formula $Ce_{1-y-z-v}Y_yTi_zD_vO_{2-x}$, wherein y is between about 0.1 and about 0.3 and wherein z is between 0.01 and 0.1.
- One of the possible oxidation states of the element A is 4.
- The crystalline structure of the oxide in the catalyst system according to the invention is of the fluorite type.
- The oxide comprises oxygen vacancies, it being possible for a minor portion of the $Ce^{4+}$ cations in the crystal lattice, especially of fluorine structure, to be converted to $Ce^{3+}$ cations, this proportion being low, typically less than 10%, or even less than 1%. Similarly, a portion of the cations $A^{n+}$ in the crystal lattice may be converted to cations $A^{(n-1)+}$. As is well known, the presence of the various ions and their relative proportion may be demonstrated in particular by measurements of magnetic susceptibility, as described, for example, in the publication *Catalysis Today*, vol. 54, pages 93-100 (1999), supplemented or replaced by TPR (temperature programmed reduction) analyses or by XPS (X-ray photon spectroscopy).
- The ion- and electron-conducting oxide has a specific surface area between 15 and 120 $m^2/g$, preferably between 50 and 100 $m^2/g$, as determined more particularly by the BET method. This method for measuring specific surface area by adsorption of inert gas, developed by S. Brunauer, P. H. Emmet and J. Teller is well known to the skilled person.
- A is an element selected from Ti, V, Cr, Mn, Fe, Sn, Co, Ni, Cu.
- D is an element selected from Pt, Pd, Rh, Ru, Cu, Fe.
- M is an element having an oxidation state of 3 in the crystal lattice, more particularly selected from Gd, Y, Sc, Sm, Nd.
- In the lists given above, a number of elements of different kinds make up component D, component A or component M, more particularly component A. In this latter configuration, the catalyst system comprises at least two elements selected from the following: Pt, Pd, Rh, Ru, Cu, Ag, Ni, Fe and Au, with v then representing the sum of the contributions of the said elements in the above formulation. More particularly, according to one possible and preferred embodiment, the system according to the invention comprises at least two elements making up component D, a first element of the type known to promote the oxidation of CO, VOC, or HC compounds selected more particularly from Pt, Pd, Rh, and a second element different from the first, of the type known for promoting the reduction of $NO_x$ compounds to $N_2$, more particularly from platinum, rhodium, or even Cu, Fe or Ni.

In the catalyst system according to the invention, the metals, more particularly the precious metals, are disposed in insertion or in substitution in the crystal lattice, preferably of the fluorite type, in cationic form. According to one possible and advantageous embodiment of the invention, the catalyst system as described above does not require additional metals deposited on the surface of the system by impregnation, especially precious metals, of the type known to date for promoting the oxidation of CO, VOC, or HC compounds, especially those based on Pt, Pd, Rh.

According to another aspect of the invention, especially if the catalyst system comprises a single metal D of type Pt or Pd, consideration may nevertheless be given, in accordance with the present invention, to combining said system with a reduction catalyst, comprising, for example, platinum, rhodium or even other metals such as Cu, Ni, Fe, by conventional techniques of impregnation.

The catalyst system is preferably in the form of a powder with a typical median diameter of 0.1 to 300 micrometers, more particularly of preferably 150 to 250 micrometers, or alternatively of 0.1 to 50 micrometers, as measured by well-known techniques of laser granulometry.

The catalyst system used according to the invention may be disposed on a support in a variety of possible ways, in accordance with any technique known from the art.

The application of the oxide powder, especially to a support, may be performed, for example, from an aqueous suspension comprising between 1% and 60% by mass of the oxide according to the invention. A median diameter of the population of oxide particles according to the invention at a size of less than 1 micron is preferable and is obtained by rotary-mill grinding. Dispersion may optionally be enhanced by the addition of a dispersant, such as, for example, the dispersant ProxB03® from Syntron, or alternatively by adjusting the pH of the aqueous suspension. Application may be made in accordance with conventional techniques.

Powder bed structures, for example, may comprise the oxide powder composed of or incorporating the catalyst system according to the invention.

Inorganic, filtering or non-filtering structures, formed by porous walls of inorganic material, for example a ceramic material, or foam structures, may also be composed of a mixed oxide of cerium, conforming to the formulation of the catalyst system according to the invention, as described above.

According to an alternative way of using the oxide according to the invention, said oxide may be supported by an inorganic structure composed of another material. More particularly, according to one possible embodiment, a porous inorganic structure made from another material is impregnated with an aqueous solution containing particles of the mixed cerium oxide conforming to the molar formulation according to the invention.

For example, the inorganic material making up some or all of the inorganic structure is selected from the following list, alone or in combination: metal or sintered metal, cordierite, aluminum titanate, alumina, mullite, silicon nitride, silicon carbide, doped or undoped zirconia. Structures made of electron-conducting inorganic material such as silicon carbide or metals allowing the catalyst system to be regenerated by polarization.

The catalyst system as described above may advantageously be used in a structure for decontamination and/or filtration of a gas laden with gaseous pollutants and optionally with solid particles, more particularly an exhaust gas from an automobile, consisting of a porous inorganic material with said catalyst system applied to it.

The invention likewise relates to a method for implementing the oxide conforming to the molar formulation according to the invention. According to a first embodiment, precursors of the elements Ce, M, A and D, preferably in the form of salts, more particularly in the form of nitrates for the elements Ce, M, and D, are mixed in a solvent.

In order to effect the insertion according to the invention of the element D into the crystal lattice of the oxide, it is important that the precursor of the element D is not reduced chemically during the operation of mixing the initial reactants and before the calcining step. The solvent is therefore selected such that the precursors of the group D are not reduced in metallic form.

Such reduction of the precursors of the element D to the metallic state may be verified usually by the appearance in the solution of a dark-colored precipitate. The turbidity of the solution may especially be determined with precision by techniques of quasi-elastic light scattering, by means, for example, of a Malvern zetasizer nano S instrument.

Following evaporation of the solvent at a temperature of between 50° C. and 70° C. under primary vacuum and then drying between 60 and 120° C., the dry mixture is calcined at a temperature of less than 800° C. To obtain a high specific surface area, calcining is conducted in such a way as to prevent combustion or self-ignition. Such a method makes it possible in particular to obtain a high specific surface area of more than 15 m$^2$/g or even more than 50 m$^2$/g according to the BET method. The product is then subjected to a reduction treatment. This reduction step is performed in a reducing atmosphere, preferably containing hydrogen, under a standard pressure, at a temperature of less than 700° C., preferably between 200 and 500° C., for a plateau of 30 minutes to 2 hours, preferably one hour or less. This step removes some of the oxygens not only at the surface but also throughout the volume of the oxide, with formation of oxygen vacancies throughout the crystal lattice. While this should not be considered to be a definitive affirmation, one hypothesis is that a heat treatment of this kind under the aforementioned conditions, liberates electrons by partial reduction of some of the cations of the element having a plurality of valences A. Such reduction would make said oxide electron-conducting without destabilizing the initial structure of the ceria (fluorite) and would substantially increase the catalytic performance of said oxide. Such a mechanism might explain the attainment according to the invention of temperatures $T_{20}$ of less than 50° C., or even 30° C., the $T_{20}$ being the temperature at which 20% conversion of the polluting species is obtained.

The present invention also relates to various uses of the catalyst system as described above.

According to a first aspect, the catalyst system may be used as a catalyst of an oxidation reaction of the VOCs or of the HCs, or of the CO to $CO_2$, or of the $NO_x$ to $NO_2$. In such a use, the element D will preferably be selected from Pt, Pd, Rh, Ag, Co, and Au.

According to another aspect, the catalyst system may be used as a catalyst for reducing $NO_x$ compounds and more particularly for reducing $NO_2$ compounds to $N_2$. In such a use, the element D will preferably be selected from Pt, Rh, Cu, Ni and Fe.

The invention likewise finds application in the structures used for the purification of air, especially in homes or in driver/passenger compartments, and more particularly of motor vehicles.

The present invention may also be useful for the decontamination of an exhaust gas from an engine, more particularly an automobile engine, more particularly a diesel engine. Such structures, generally denoted by the term "honeycomb" or particle filters in the case of filtering structures, comprise at least one, and preferably a plurality of, monolithic honeycomb block(s). In contrast to the purification devices described before, in such filters, said block or blocks comprise an assembly of adjacent passages or channels with mutually parallel axes, separated by porous walls closed off by plugs at one or other of their ends in order to delimit entry passages opening at a gas intake face and exit passages opening at a gas discharge face, such that the gas traverses the porous walls. Examples of such structures, assembled or non-assembled, are described, for example, in publications EP 0816065, EP 1142619, EP 1306358 or else EP 1591430.

The present invention relates, moreover, to the use of the catalyst system as described above for the decontamination of a gas from:
combustion systems for energy production;
combustion systems in the service and residential sectors, especially heating systems which produce gases for treatment as CO, HC compounds, VOC compounds and even $Na_x$ compounds;
combustion systems in industry, more particularly in the glass, metallurgical, and cement industries;
terrestrial, maritime and air transport;
waste treatment, more particularly incinerators.

The present invention likewise relates to the decontamination of interior and/or exterior air.

According to another possible pathway, the invention relates, moreover to the use of the catalyst system as described above for producing a catalytic gas synthesis reactor, especially to a membrane reactor.

The invention and its advantages will be appreciated more fully on a reading of the non-limitative examples which follow.

EXAMPLE 1

Inventive

An oxide of general composition $Ce_{0.74}Y_{0.2}Ti_{0.05}Pt_{0.01}O_2$ is first prepared by mixing the reactants given below, in proportions calculated to obtain the following in the initial mixture in moles: 0.2 part of Y, 0.74 part of Ce, 0.05 part of Ti, 0.01 part of Pt.

The reactants used are as follows:
yttrium nitrate hexahydrate: $Y(NO)_3.6H_2O$,
cerium nitrate hexahydrate $Ce(NO_3)_3.6H_2O$,
titanium isopropoxide $Ti(OC_3H_5)_4$,
platinum nitrate $Pt(NO_3)_2$,
glacial acetic acid.

In a first stage, the precursors are dissolved in isopropanol. The precursors, in proportions calculated to give the compound $Ce_{0.74}Y_{0.2}Ti_{0.05}Pt_{0.01}O_2$, are dissolved in ultra-pure isopropanol at ambient temperature and with stirring. The addition of acetic acid to the mixture is carried out before the titanium isopropoxide is added. For a synthesis of 5 g of compound, approximately 30 ml of isopropanol were added. The resulting solution is then placed in a rotary evaporator at 60° C. under a reduced pressure ($P_{atm}$/800 mbar) for evaporation of the isopropanol. The viscous liquid thus obtained is poured into an alumina crucible and dried at 100° C. for 48 hours.

In a second stage, the nitrates are subjected to a decomposition treatment. This treatment involves heating in air to 500° C. with a heating ramp of the order of 50° C./h. The oxide compound obtained, with composition $Ce_{0.74}Y_{0.2}Ti_{0.05}Pt_{0.01}O_2$, has a brown color after manual grinding in a mortar.

Its specific surface area, as measured according to the BET method is approximately 80 m$^2$/g.

According to a second step, the oxide is then treated to give the catalyst system according to the invention, in other words is reduced, under conditions which allow a highly oxygen ion-deficient state to be achieved in the crystal lattice of the oxide. More specifically, the oxide is subjected to reduction under pure H$_2$ (>99.9% by mass) at a temperature close to or exceeding 300° C. for a time (at least one hour) sufficient to lead to a highly oxygen-deficient state, in other words an oxide of general formulation $Ce_{0.74}Y_{0.2}Ti_{0.05}Pt_{0.01}O_{2-x}$ (x>0).

EXAFS and XPS measurements show that both before and after the reduction treatment platinum is present only in ionic form. More particularly, the measurements performed demonstrate the absence of metallic platinum (Pt oxidation state of 0). Such results indicate:

that all of the initial platinum is inserted (and remains inserted) in the crystal lattice of the catalyst system according to the invention, and the high stability of such a structure, with the treatment under a reducing atmosphere at 300° C. having not converted the Pt to metallic Pt.

EXAMPLE 2

Comparative

In this example, the procedure as described in example 1 above is repeated, but without the addition of titanium isopropoxide Ti.

EXAMPLE 3

Comparative

In this example, the procedure as described in example 1 above is repeated, but without the addition of yttrium nitrate tetrahydrate.

EXAMPLE 4

Inventive

In this example, the procedure as described in example 1 above is repeated, but the solution of titanium isopropoxide is replaced by a solution of iron nitrate. A powder is obtained with a composition of $Ce_{0.75}Y_{0.2}Fe_{0.05}Pt_{0.01}O_2$.

EXAMPLE 5

Comparative

In this example, a power of an oxide with composition $Ce_{0.75}Y_{0.2}Ti_{0.05}O_2$ was impregnated with 0.01 mol % of platinum (in nitrate form), to give a Pt/Ce ratio substantially identical to that of the "mass" oxide described in example 1. The reduction treatment is then carried out under conditions similar to the example. According to this embodiment, the Pt is not inserted into the crystal lattice of the oxide, but is only disposed on the surface of the oxide particles with composition $Ce_{0.75}Y_{0.2}Ti_{0.05}O_2$, the platinum being reduced by the reduction treatment.

EXAMPLE 6

Comparative

In this example, porous alumina beads with a specific surface area of 150 m$^2$/g and a pore volume of 0.45 ml/g were impregnated with a solution of yttrium nitrate, cerium nitrate, titanium isopropoxide, and platinum nitrate in isopropanol. The precursors, introduced in the same proportions as described in example 1, are dissolved in ultra-pure isopropanol at ambient temperature and with stirring. The resulting solution is then mixed with the alumina beads and the isopropanol. The mixture is dried in an oven at 100° C. to complete the impregnation with the alumina beads, before calcining at 500° C.

CO Conversion Test

The samples from the inventive and comparative examples above, ground in the form of a powder screened to between 125 and 250 microns, are placed in a fixed-bed quartz reactor. More specifically, 100 mg or 200 mg of the catalyst system are introduced into the reactor, which is fitted with a porous quartz frit supporting the powder. The volume of the catalyst is of the order of 0.15-0.25 cm$^3$. The catalyst is placed in a stream of He (10 L/h at atmospheric pressure and ambient temperature). Then a reaction mixture composed of a CO/O$_2$/He mixture is admitted to the catalyst at a total flow rate of 10 L/h and with a space hourly velocity of 50 000 h$^{-1}$. The gas mixture initially comprises 10 000 ppm of O$_2$ and 6000 ppm of CO. The temperature of the reactor in which the powder bed is situated is increased gradually from ambient to 300° C. at a ramp rate of 2° C./min.

Online analysis of the gases is carried out by a microchromatograph (Agilent, R-3000) equipped with two parallel analytical channels, each having a catharometric microdetector (TCD). The first channel, molecular sieve (5A, 14 m in length and 10 32 mm in diameter) is equipped with a preliminary column (back-flush) to separate the small molecules (O$_2$, CO). The second channel is equipped with a PLOT U column (6 m×0.32 mm), which is used to separate the larger molecules such as carbon dioxide.

Tests for oxidation of the VOCs (formaldehydes) were carried out at ambient temperature. These tests showed complete removal of these species from the product of the invention, immediately and continuing over a number of hours.

The results obtained are set out in table 1 below.

The first column indicates the example whereby the powder in the catalyst system is synthesized, and the second column indicates the amount of this catalyst used in the reactor in milligrams:

TABLE 1

| Sample according to | Amount of powder (mg) | Specific surface area (m$^2$/g) | Temperature at which 50% conversion of CO to CO$_2$ is obtained (° C.) | Temperature at which 20% conversion of CO to CO$_2$ is obtained (° C.) |
|---|---|---|---|---|
| Example 1 | 200 | 80 | 64 | 45 |
| Example 1 | 100 | 80 | 85 | 50 |

TABLE 1-continued

| Sample according to | Amount of powder (mg) | Specific surface area (m²/g) | Temperature at which 50% conversion of CO to CO₂ is obtained (° C.) | Temperature at which 20% conversion of CO to CO₂ is obtained (° C.) |
|---|---|---|---|---|
| Example 2 (comparative) | 200 | 64 | 75 | 56 |
| Example 3 (comparative) | 200 | / | 100 | 76 |
| Example 4 | 200 | 60 | 70 | 53 |
| Example 5 (comparative) | 100 | 80 | 98 | 75 |
| Example 6 (comparative) | 100 | / | 122 | 92 |

The results obtained, especially those reported in table 1, show that example 1 according to the invention exhibits lower $T_{20}$ and $T_{50}$ temperatures and therefore a greater catalytic activity at low temperature, than comparative examples 2 and 3, which do not include, respectively the elements yttrium or titanium in their crystal lattice.

Aging tests have shown, moreover, that the system according to the invention remains catalytically active at a level substantially equivalent to that described above after a number of operating cycles.

The substitution of the element Ti (example 1) by the element Fe (example 4) in the composition of the oxide produces a similar, albeit slightly diminished, catalytic performance level.

The results of example 5 in accordance with the prior art (obtained by impregnating the oxide with Pt) compared with those for example 1 (in which the platinum is in cationic form in the crystal lattice according to the invention) show, for a given amount of catalyst used, that the catalytic performance is substantially less when the platinum is not inserted into the crystal lattice of the oxide but adsorbed on its surface in metallic form.

Example 6, by comparison with example 1 shows, for a given quantity of catalyst used, that the application of the same precursors as those used to form the oxide of the invention, but on a high specific surface area support of alumina bead type results, unexpectedly, in impaired performance by comparison with that of a bed of powder particles formed solely of the oxide according to the invention. A catalyst system consisting solely of the oxide according to the invention may therefore be preferentially applied directly to the substrate, without the required presence of a support material of high specific surface area, typically of the alumina bead type, of 100 to 200 m²/g.

The invention claimed is:

1. A catalyst system, comprising an oxide of fluorite crystalline structure of formula:

$$Ce_{1-u}M_yA_zD_vO_{2-x},$$

wherein:
Ce is cerium,
u is between 0.05 and 0.45,
M is at least one element selected from the group consisting of Gd, Y, Sc, Sm, Nd, Pr, and Zn,
y is between 0.01 and 0.4,
A is at least one element possessing a plurality of oxidation states selected from the group consisting of Ti, Ga, In, V, Cr, Mn, Fe, Sn, Co, Ni, and Cu,
z is greater than 0 and less than 0.4,
D is at least one element other than A selected from the group consisting of Pt, Pd, Rh, Ru, Cu, Fe, Ag, and Au,
v is between 0.001 and 0.4,
x is greater than 0,
wherein metals in the oxide are disposed in insertion or in substitution in the crystal lattice and
wherein the system is suitable for removal of a CO compound.

2. The catalyst system as claimed in claim 1 wherein the oxide comprises oxygen vacancies in its crystalline structure.

3. The catalyst system as claimed in claim 1, wherein an electronic resistivity of the oxide is less than 1000 ohms.cm at 400° C. and an ionic conductivity of the oxide is between $10^{-6}$ and 1 siemens/cm at 400° C.

4. The catalyst system as claimed in claim 1, wherein 1−u is equal to 1−y−z−v.

5. The catalyst system as claimed in claim 1, wherein M is at least one element selected from the group consisting of Gd, Y, Sc, Pr, Sm, and Nd.

6. The catalyst system as claimed in any of the claim 1, wherein one of the valences of the element A is 4.

7. The catalyst system as claimed in claim 1, wherein the oxide comprises oxygen vacancies in its crystalline structure and wherein some cations $A^{4+}$ in the crystalline structure are converted to cations $A^{3+}$.

8. The catalyst system as claimed in claim 1, wherein x is less than 0.5.

9. The catalyst system as claimed in claim 1, wherein y is between 0.05 and 0.3.

10. The catalyst system as claimed in claim 1, wherein v is between 0.005 and 0.2.

11. The catalyst system as claimed in claim 1, wherein z is between 0.01 and 0.2.

12. The catalyst system as claimed claim 1, wherein A is at least one element selected from the group consisting of Ti, V, Cr, Mn, Fe, Sn, Co, Ni, and Cu.

13. The catalyst system as claimed in claim 1, wherein D is at least one element selected from the group consisting of Pt, Pd, Rh, Ru, Cu, and Fe.

14. The catalyst system as claimed in claim 1, wherein D comprises two different elements, of which a first is selected from the group consisting of Pt, Pd, and Rh, and a second, which is different from the first element, is selected from the group consisting of Pt, Rh, Cu, Ni, and Fe.

15. The catalyst system as claimed in claim 1, wherein M is yttrium and A is titanium.

16. The catalyst system of claim 15, wherein y is between 0.1 and 0.3.

17. The catalyst system of claim 15, wherein z is between 0.01 and 0.1.

18. The catalyst system of claim 1, consisting of at least one of the oxide of fluorite crystalline structure.

19. A powder of an oxide of the catalyst system of claim 1.

* * * * *